United States Patent
Vogel et al.

(10) Patent No.: US 9,227,490 B2
(45) Date of Patent: Jan. 5, 2016

(54) GUIDE RAIL FOR A SLIDING ROOF SYSTEM AND METHOD OF PRODUCING SUCH A GUIDE RAIL

(75) Inventors: Stefan Vogel, Ortenberg (DE); Rainer Grimm, Frankfurt (DE); Stefan Kunkel, Aschaffenburg (DE); Jürgen Schrader, Weilheim Im Schönbuch (DE)

(73) Assignee: DAIMLER AG (DE)

( * ) Notice: Subject to any disclaimer, the term of this patent is extended or adjusted under 35 U.S.C. 154(b) by 29 days.

(21) Appl. No.: 13/814,853

(22) PCT Filed: Aug. 4, 2011

(86) PCT No.: PCT/EP2011/003919
§ 371 (c)(1),
(2), (4) Date: Aug. 30, 2013

(87) PCT Pub. No.: WO2012/019737
PCT Pub. Date: Feb. 16, 2012

(65) Prior Publication Data
US 2015/0015032 A1    Jan. 15, 2015

(30) Foreign Application Priority Data

Aug. 10, 2010 (DE) .......................... 10 2010 033 875

(51) Int. Cl.
*B60J 7/02* (2006.01)
*B60J 7/043* (2006.01)

(52) U.S. Cl.
CPC .. *B60J 7/02* (2013.01); *B60J 7/024* (2013.01); *B60J 7/0435* (2013.01); *Y10T 29/49815* (2015.01)

(58) Field of Classification Search
CPC ............. B60J 7/02; B60J 7/024; B60J 7/0435
USPC ............................. 296/213, 214, 216.01–224
See application file for complete search history.

(56) References Cited

U.S. PATENT DOCUMENTS 2,219,594 A * 10/1940 Lang ................................ 49/504
2,299,595 A * 10/1942 Rydquist ......................... 428/88

(Continued)

FOREIGN PATENT DOCUMENTS

| CN | 1861433 A | 11/2006 |
|---|---|---|
| DE | 4108197 A1 | 9/1991 |

(Continued)

OTHER PUBLICATIONS

Written Opinion for International Application No. PCT/EP2011/003919.

(Continued)

*Primary Examiner* — Dennis H Pedder
(74) *Attorney, Agent, or Firm* — Cantor Colburn LLP

(57) ABSTRACT

A guide rail (10) for a vehicle sliding roof system, having a guide (22) which can receive a sliding element (18) for shifting motion that is coupled to a cover of the sliding roof system, the guide (22) including a shifting section (17) that extends in a substantially straight line, and the guide rail (10) being made of metal, in particular of an aluminum alloy, is characterized in that it includes a lifting section (16) which integrally adjoins the shifting section (17) and extends obliquely to the direction of extent of the shifting section (17). Also described is a method of producing a guide rail for a vehicle sliding roof system.

11 Claims, 3 Drawing Sheets

(56) References Cited

U.S. PATENT DOCUMENTS

| | | | |
|---|---|---|---|
| 4,597,232 A * | 7/1986 | Lingemann | 52/209 |
| 5,114,208 A * | 5/1992 | Ikeda et al. | 296/216.04 |
| 2006/0012224 A1 | 1/2006 | Boehm et al. | |
| 2006/0254147 A1 | 11/2006 | Biewer et al. | |
| 2007/0228779 A1 | 10/2007 | Stallfort | |

FOREIGN PATENT DOCUMENTS

| | | |
|---|---|---|
| DE | 94 07 234 U1 | 4/1994 |
| DE | 202005007475 U1 | 8/2005 |
| DE | 102004034463 A1 | 2/2006 |
| DE | 202005018138 U1 | 4/2006 |
| DE | 102006050851 * | 8/2008 |
| DE | 102006050851 B4 | 8/2008 |
| DE | 602004010645 T2 | 11/2008 |
| EP | 1504940 A1 | 2/2005 |
| EP | 1 625 960 A1 | 2/2006 |
| EP | 1 844 967 A1 | 10/2007 |
| JP | 2001055047 A | 2/2001 |

OTHER PUBLICATIONS

International Search Report for International Application No. PCT/EP2011/003919.
English translation of the International Preliminary Report on Patentability.
Preliminary Search Report for French Patent Application No. 11 57173.
English Translation for JP2001055047 Abstract.
Chinese Office Action dated Nov. 15, 2014 for Patent Application No. 201180039185.1.
English Translation to Chinese Office Action dated Nov. 15, 2014.
English Translation to EP1844967 Abstract.

* cited by examiner

GUIDE RAIL FOR A SLIDING ROOF SYSTEM AND METHOD OF PRODUCING SUCH A GUIDE RAIL

CROSS REFERENCE TO RELATED APPLICATIONS

This application is a National Phase Application of Patent Application PCT/EP2011/003919 filed on Aug. 4, 2011, which claims priority to DE10 2010 033 875.3 filed on Aug. 10, 2010, the contents each of which are incorporated herein by reference thereto.

TECHNICAL FIELD

The present invention relates to a guide rail for a vehicle sliding roof system, including a guide slot which can receive a sliding element for shifting motion that is coupled to a cover of the sliding roof system, the guide slot including a shifting section that extends substantially in a straight line, and the guide rail being made of metal, in particular of an aluminum alloy. The invention further relates to a method of producing such a guide rail.

BRIEF DESCRIPTION OF RELATED ART

A guide rail for a vehicle sliding roof system is disclosed in DE 20 2005 007 475. It is part of a sliding roof system 4 which is schematically shown in FIG. 1 with respect to a vehicle 1 having a vehicle roof 2. The sliding roof system 4 includes two cover parts 6, 8, of which at least the first cover part 6 is adjustable. The sliding roof system 4 may, of course, also be a so-called sliding/tilting roof.

A guide rail 10' which is shown in FIG. 2 is part of the sliding roof system 4. The guide rail includes a guide slot which consists of two sections, namely, a lifting section 16' which, as viewed in the longitudinal direction L of the guide rail 10', extends obliquely upward and to the rear, and a shifting section 17' which extends substantially in a straight line and parallel to the longitudinal direction L. The lifting section 16' serves to initially raise a cover part 6' that is guided in the guide slot via a carriage 20' having a sliding element 18' mounted thereto, upon an adjustment of the cover part 6' in the longitudinal direction of the vehicle. When the carriage is adjusted further to the rear, the sliding element is guided in the shifting section 17' to the rear substantially parallel to the longitudinal direction L of the guide rail (and thus of the vehicle). It should be appreciated that the guide rail may be configured to be generally slightly curved, so that it can follow the curvature of the roof 2 or a curved longitudinal edge of the roof opening. But, for simplification, the guide rail is considered to be "straight" here. The term "oblique" here is understood to mean an orientation of the lifting section 16' that significantly differs from the direction of extent of the shifting section 17', in particular by more than 20 degrees.

For the purpose of a simplified manufacture, the guide rail 10' is designed in two parts, namely, a rail element 14' and an attachment part 12'. The rail element 14' only contains the shifting section 17', running in a straight line, of the guide slot. The allows the rail element 14' to be produced from a profiled part which is extruded, for example. The lifting section 16', which extends obliquely to the longitudinal direction of the guide rail 10', is formed in the attachment part 12', which consists of a plastic material, for example, and is fitted to the front end (in relation to the vehicle) of the rail element 14', so that the guide rail 10' is formed.

A disadvantage of this configuration is that when the cover part 6' is shifted to the rear, the sliding element 18' needs to travel over the abutting edges of the joint between the rail element 14' and the attachment part 12'. This leads to wear, noises and, possibly, a spurious response of an anti-pinch protection.

The object of the invention resides in further developing a guide rail of the type initially mentioned to the effect that the wear and noises that are generated when the sliding element moves from the lifting section to the shifting section are reduced.

BRIEF SUMMARY

To achieve this object, according to the invention provision is made in a guide rail of the type initially mentioned that it includes a lifting section which integrally adjoins the shifting section and extends obliquely to the direction of extent of the shifting section. The invention is based on the fundamental concept of totally eliminating the joint between the lifting section and the shifting section so as to obtain a continuous guide for the sliding element.

Preferably, provision is made that the guide is formed by at least one guide web around which the sliding element engages on two sides. This allows the lifting section to be bent in relation to the shifting section with comparatively little effort, so that the guide rail can still be formed starting from a straight profiled part.

According to a preferred embodiment, provision is made that the guide is formed by two legs that are located opposite each other and each have an end provided with the guide web. Owing to this design, the sliding element is guided particularly reliably in a direction transverse to the guide rail.

It is preferably provided for that the legs are connected with each other by a base part in the region of the shifting section. In this way, a very stable guide rail is obtained.

According to the preferred embodiment, provision is made that in the region of the lifting section, the legs are connected with each other by at least one connecting web which is arranged on the side facing away from the guide web. The connecting web increases the stability of the guide rail in the region of the lifting section, so that the sliding element is reliably guided in that region, too.

The connecting web may be provided with an opening which can receive a fastening element. This allows the guide rail to be bolted to a carrier frame, for example.

To achieve the above-mentioned object, according to the invention provision is also made for a method of producing a guide rail for a vehicle sliding roof system, including the steps of: at first, providing a straight profiled rail made of an aluminum alloy which includes a guide for a sliding element, the guide being formed by two webs that are arranged side by side and are connected with each other by a base part and each include a guide web on their side facing away from the base part; subsequently, removing sections of the base part; then, bending the webs in that section in which the base part has been removed, so that a lifting section is formed which extends obliquely to the remaining shifting section of the guide rail. This method is based on the fundamental concept of using an inherently stiff profiled rail which may be extruded, for example. The obliquely bent lifting section is produced in that the base part is removed in sections. This purposefully weakens the profiled part in such a manner that the lifting section may be bent off while at the same time a sufficient stability is still provided. In addition, this removal of sections of the base part allows the webs to be held in position during deformation.

BRIEF DESCRIPTION OF THE DRAWINGS

The invention will now be described below with reference to an embodiment which is illustrated in the accompanying drawings, in which.

DETAILED DESCRIPTION

Figure 1:
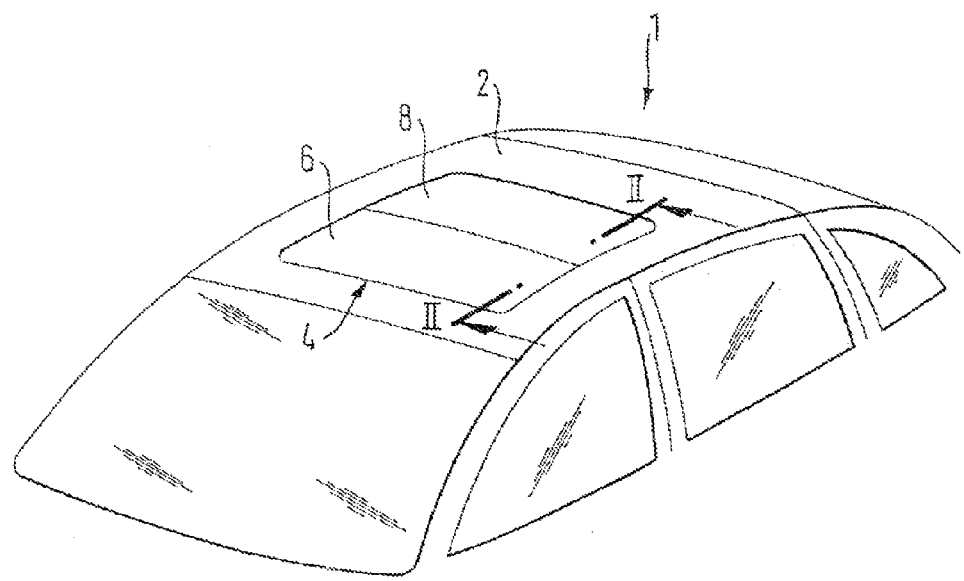
FIG. 1 shows a schematic view of a vehicle roof with a sliding roof system.
Figure 2:
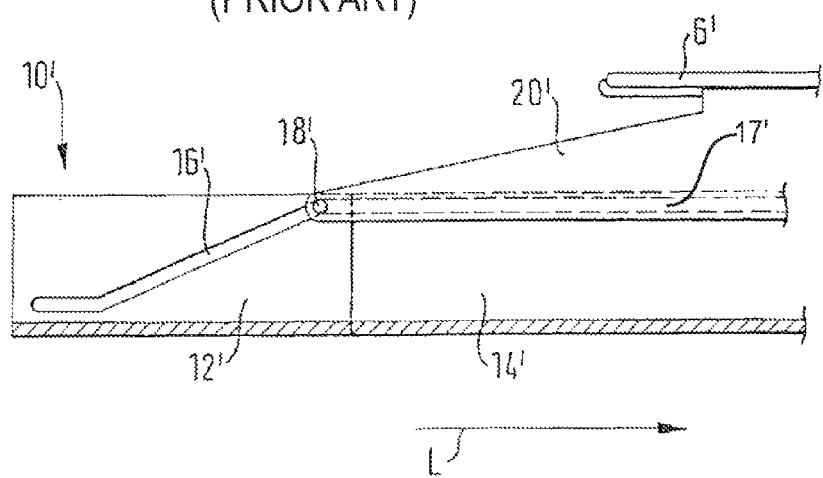
FIG. 2 shows a schematic sectional view of a guide rail according to the prior art.

FIGS. 3 to 6 show the front portion of a guide rail 10 as is made use of in a sliding roof system 4 according to FIG. 1. Typically, two guide rails are provided here which are mounted to the vehicle roof 2 on both sides of a roof opening, the guide rails extending generally parallel to each other.

The guide rail 10 consists of a shifting section 17 which extends in a substantially straight line and a lifting section 16 which, as related to the direction of travel of the vehicle, is arranged on the front edge of the roof opening 4. The guide rail 10 is formed of a profiled part made of an aluminum alloy, in which various functional geometries (for example, a cable guide or a water gutter) are integrated. However, only the guide for the sliding element 18 will be discussed below since the guide is of interest in connection with the invention.

The sliding element 18, which can be adjusted along the guide rail to adjust the cover 6 of the sliding roof system, is received in a guide 22 which in this case is formed by two legs 24 located opposite each other. The legs are arranged parallel to each other and are connected with each other by a base part 26 in the region of the shifting section 17. At the end facing away from the base part 26, each leg 24 is provided with a guide web 28, the two guide webs facing each other. In other words, the free longitudinal edges of the guide webs 28 are located across from each other at a distance. The guide webs 28, the legs 24, and the base part 26 together enclose a rectangular cross-section.

Figure 3:
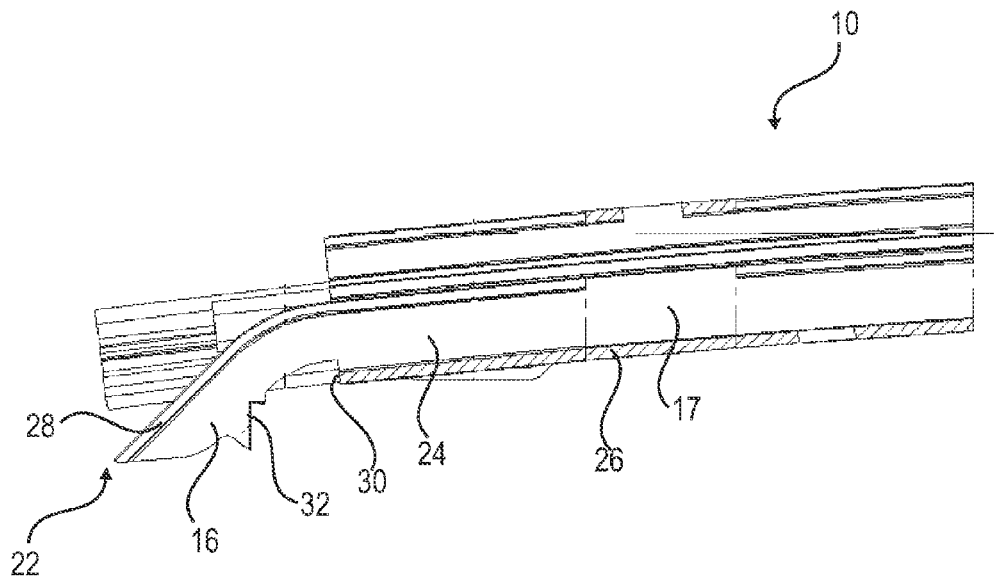
FIG. 3 shows a guide rail according to the invention, in section.
Figure 4:
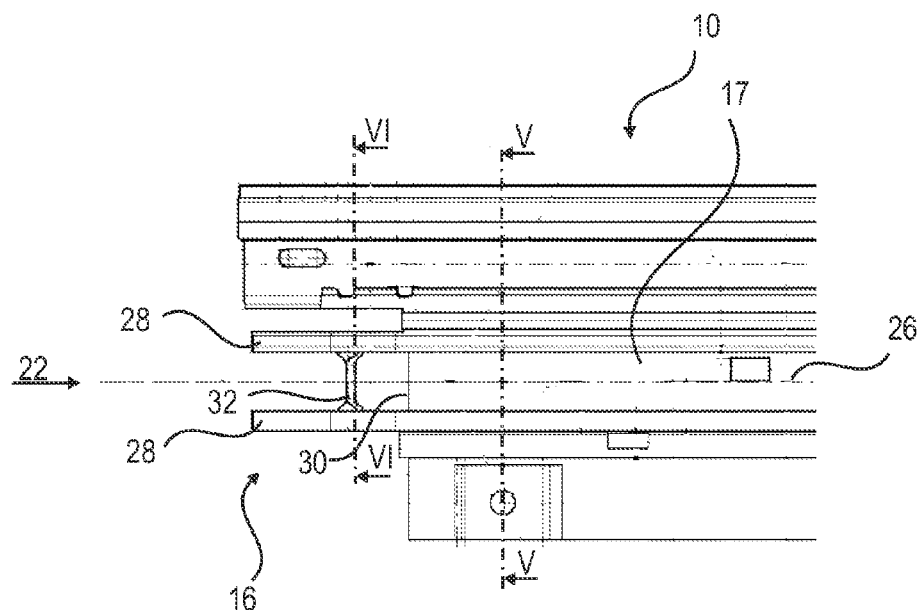
FIG. 4 shows a top view of the guide rail of FIG. 3.

The base part 26 ends where the shifting section 17 also ends (see the front face 30 of the base part shown in FIGS. 3 and 4). As from the front face 30, the two legs 24 freely project from the rest of the guide rail. They are connected with each other here only by a connecting web 32 which contains an opening 34. A fastening bolt may be fitted through the opening 34, for example, which is used for bolting the guide rail to, for example, a frame or to the vehicle body in the region of the lifting section 16.

As can be seen in particular in FIG. 3, the lifting section 16 extends obliquely to the direction of extent of the shifting section 17. In the exemplary embodiment shown, the lifting section 16 extends at an angle of about 45 degrees in relation to the direction of extent of the shifting section 17. This is attained in that the two legs 24 are bent off downward together with the webs 28. This is possible since the base part 26 has been removed, for example milled off, and the lower region of the legs 24 has also been milled off, so that the legs have a lower height (see the shoulder in the region of the front face 30 in FIG. 3). In this way, the flexural rigidity of the guide 22 formed of the legs 24 and the guide webs 28 is reduced to such an extent that the webs can be bent. The connecting web 32 is advantageously obtained here in that some sections of the base part 30 are not removed but, rather, a plate remains which is connected with the legs 24 by narrow transition sections. This plate is then rotated by about 45 degrees as compared to its original orientation so that, after the legs are bent off, it is roughly perpendicular. The contact surface of the connecting web 32 is oriented parallel to the front face of the carrier frame.

Figure 5:
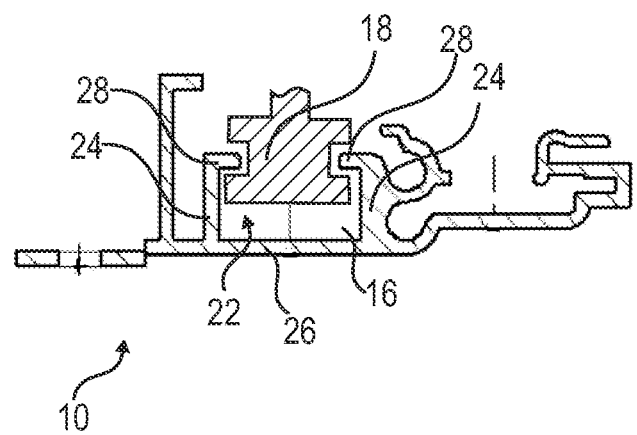
FIG. 5 shows a section taken along the plane V-V of FIG. 4.
Figure 6:
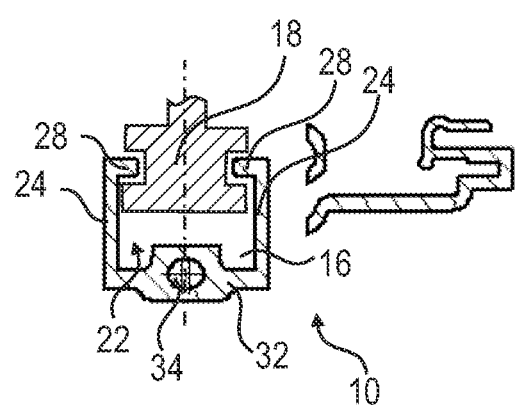
FIG. 6 shows a section taken along the plane VI-VI of FIG. 4.

As can be seen in FIGS. 5 and 6, the sliding element 18 is configured to engage around the guide webs 28 on the upper and lower sides. This ensures a guidance in the z-direction. Furthermore, the sliding element 18 is positioned between the two guide legs 28 located opposite each other, so that a guidance in the y-direction is also ensured. In the x-direction, the sliding element 18 is designed to be so short that it can slide on the guide webs 28 without difficulty also in the region of the curved transition from the lifting section 16 to the shifting section 17 without getting jammed there.

The invention claimed is:

1. A guide rail for a vehicle sliding roof system, comprising:
   a guide for receiving a sliding element coupled to a cover of the sliding roof system, the guide including two side legs disposed opposite one another, each leg having one end provided with a guide web, and the guide having a shifting section that extending substantially in a straight line, and the shifting section being provided with a base wall interconnecting the two side legs,
   wherein the guide further includes a lifting section formed as one piece with the shifting section and extending obliquely to the extension direction of the shifting section, and
   wherein the base wall does not extend into the region between the two side legs in the obliquely extending lifting section.

2. The guide rail according to claim 1, characterized in that the guide of each leg is engaged by the sliding element on two sides.

3. The guide rail according to claim 1, characterized in that in the region of the lifting section, the legs are connected with each other by at least one connecting web which is arranged on the side facing away from the guide web.

4. The guide rail according to claim 3, characterized in that the connecting web is provided with an opening which can receive a fastening element.

5. A method of producing a guide rail for a vehicle sliding roof system, comprising the steps of:
   providing a straight profiled rail made of an aluminum alloy which includes a guide for a sliding element, the guide being formed by two side legs that are arranged side by side and are connected to each other by a base wall and each includes a guide web on their side opposite from the base wall;
   removing sections of the base wall;
   bending the legs in the section where the base wall has been removed, so that a lifting section is formed which extends obliquely to the remaining shifting section of the guide rail.

6. The method as in claim 5, wherein the two legs are disposed opposite one other, each leg having one end provided with the guide web.

7. The method as in claim 6, wherein the legs are connected with each other by the base wall in the region of the shifting section.

8. The method as in claim 6, characterized in that in the region of the lifting section, the legs are connected with each other by at least one connecting web which is arranged on the side facing away from the guide web.

9. The method as in claim 8, wherein the connecting web is provided with an opening which can receive a fastening element.

10. The method as in claim 7, characterized in that in the region of the lifting section, the legs are connected with each other by at least one connecting web which is arranged on the side facing away from the guide web.

11. The method as in claim 10, wherein the connecting web is provided with an opening which can receive a fastening element.

\* \* \* \* \*

UNITED STATES PATENT AND TRADEMARK OFFICE
CERTIFICATE OF CORRECTION

PATENT NO. : 9,227,490 B2
APPLICATION NO. : 13/814853
DATED : January 5, 2016
INVENTOR(S) : Stefan Vogel et al.

It is certified that error appears in the above-identified patent and that said Letters Patent is hereby corrected as shown below:

Title page:

Item (75) Inventors: please replace inventor Jürgen Schrader address "Weilheim Im Schonbuch" with --Weil im Schönbuch--

Signed and Sealed this
Twenty-eighth Day of June, 2016

Michelle K. Lee
*Director of the United States Patent and Trademark Office*